May 20, 1941.　　　R. C. TROYER　　　2,242,687
GREASE PUMP
Filed Aug. 3, 1939　　　2 Sheets-Sheet 1
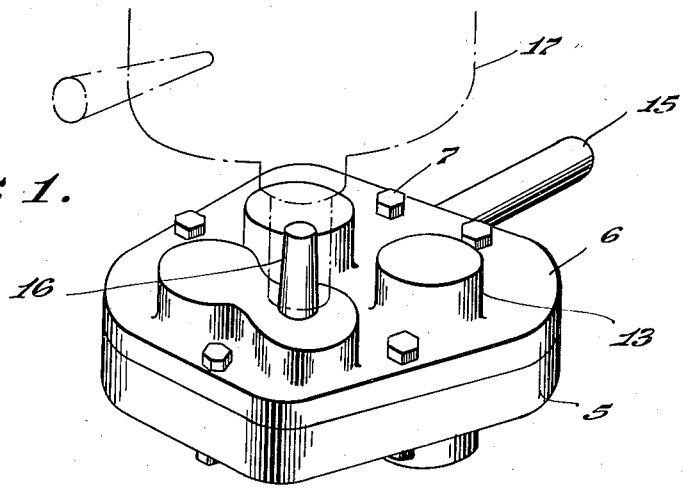
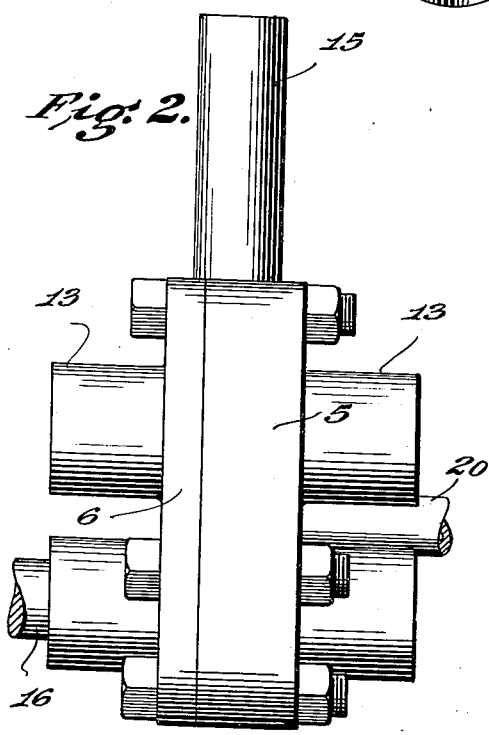
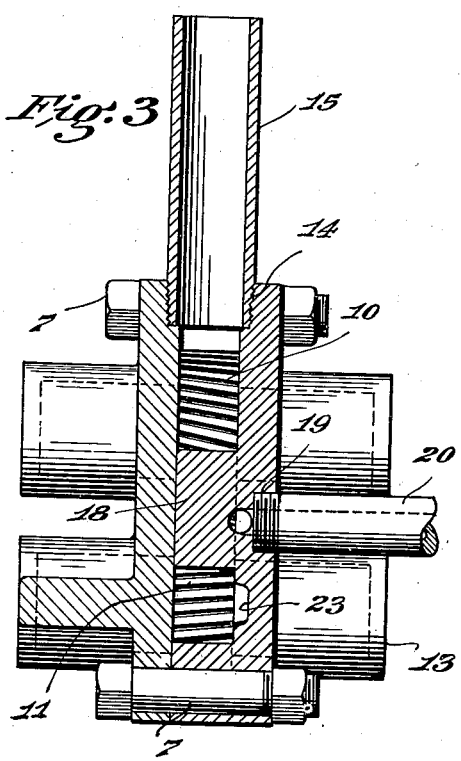
Inventor
R. C. Troyer
By Lacey & Lacey, Attorneys May 20, 1941.  R. C. TROYER  2,242,687
GREASE PUMP
Filed Aug. 3, 1939  2 Sheets-Sheet 2

Inventor
R. C. Troyer
By Lacey & Lacey, Attorneys

Patented May 20, 1941

2,242,687

UNITED STATES PATENT OFFICE 2,242,687

GREASE PUMP

Ralph C. Troyer, Newton, Kans.

Application August 3, 1939, Serial No. 288,239

5 Claims. (Cl. 103—126)

This invention relates to lubricating devices and more particularly to a grease gun especially designed for lubricating side rods and other moving parts of locomotives.

The object of the invention is to provide a grease gun of simple and inexpensive construction having means for attachment to the standard lubricating fittings of a locomotive and by means of which the grease will be constantly fed under pressure to said fittings for delivery to the side rods of a locomotive.

A further object of the invention is to provide a lubricating device comprising a casing having coacting main gears in communication with a source of grease supply and provided with driving gears meshing with said main gears, one of the driving gears being operatively connected with a motor so that as the main gears rotate the teeth thereof will force the grease outwardly through an opening in one wall of the casing.

A further object is to provide the casing with converging passages or ducts which intersect at the discharge opening in said casing and through which the grease is fed to said opening, there being an auxiliary grease passage or by-pass arranged between the driving gears for returning any grease that might adhere to said driving gears back to the converging passages and thence to the discharge opening so as to prevent choking or clogging of the driving gears.

A still further object of the invention is generally to improve this class of devices so as to increase their utility, durability and efficiency.

Figure 5:
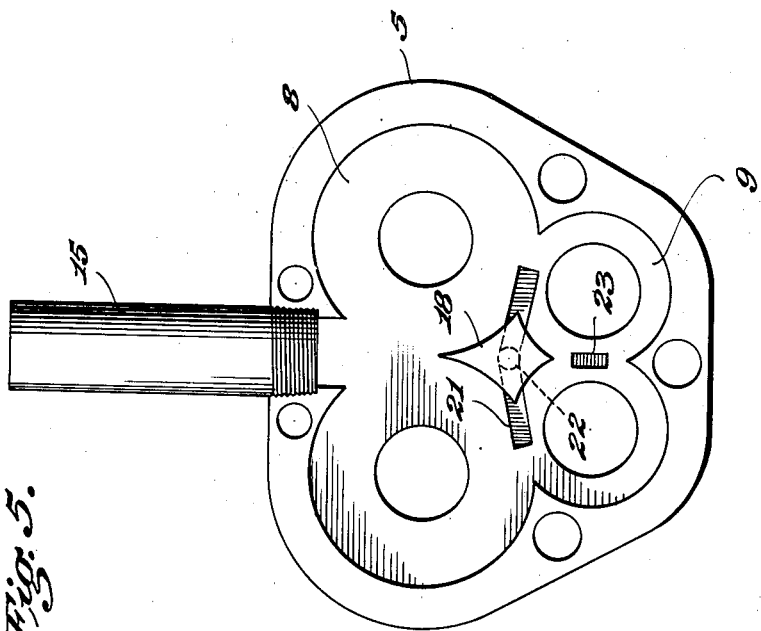
Figure 4:
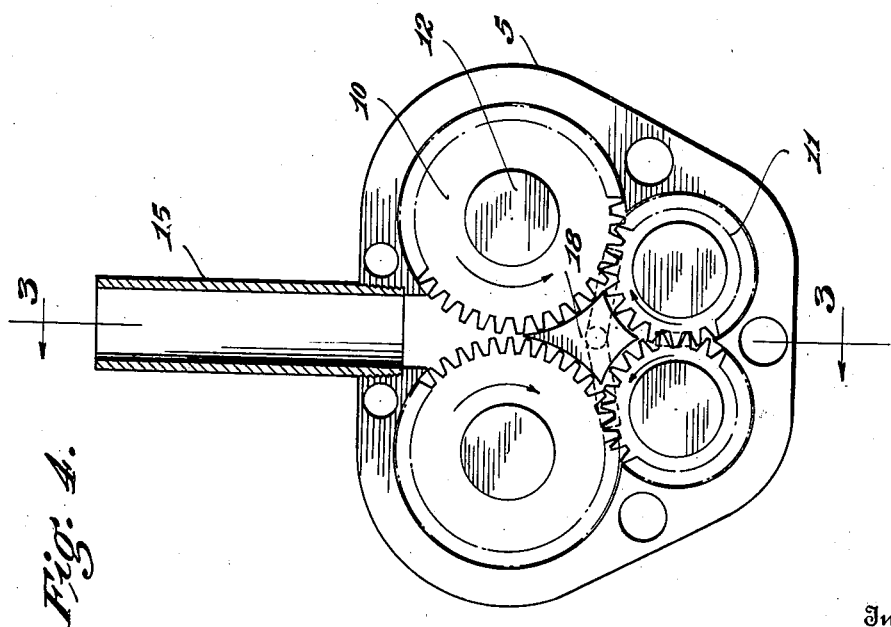

In the accompanying drawings forming a part of this specification and in which similar numerals of reference indicate corresponding parts in all the figures of the drawings:

Figure 1 is a perspective view of a grease gun embodying the present invention, the air motor for driving the gears being indicated in dot and dash lines, Figure 2 is a side elevation, Figure 3 is a vertical sectional view taken on the line 3—3 of Figure 4, Figure 4 is a front elevation with the cover plate removed, and Figure 5 is a similar view with the gears removed showing the construction of the grease passages and by-pass.

The improved grease gun forming the subject-matter of the present invention comprises a casing or housing of any desired shape or contour and preferably formed in two sections 5 and 6, one of which constitutes the body of the device and the other a cover plate, said sections being detachably secured together by bolts or similar fastening devices 7.

The body portion 5 is cut or reamed out to form circular upper and lower compartments 8 and 9, the upper compartments 8 being adapted to receive coacting main gears 10 and the lower compartments 9 being smaller than the compartments 10 and adapted to receive intermeshing driving gears 11. The gears 10 and 11 are provided with stub shafts 12 which extend through openings in the sections 5 and 6 of the casing with their terminals journaled in caps 13 preferably cast or otherwise formed integral with said sections, as best shown in Figure 2 of the drawings. One end of the body portion is provided with a threaded opening 14 in which is fitted a correspondingly threaded tubular member or magazine 15 adapted to receive sticks of lubricating grease, the lower end of the magazine being disposed opposite the coacting main gears 10 so that as the gears 10 rotate the grease from the magazine will be fed downwardly between the same. One of the driving gears 11 is provided with a boss or extension 16 for attachment to a source of power, preferably an air motor 17, so that, when the motor is in operation, motion will be transmitted from said motor through the medium of the driving gears 11 to the main gears 10.

Formed integral with the body portion 5 is a rigid block 18 having its side walls curved to conform to the contour of the gears 10 and 11 and its outer face flat and adapted to bear against the cover 6 of the casing. Formed in the body portion 5 opposite the rigid block 18 is a discharge opening 19, the walls of which are threaded for detachable engagement with the standard fitting 20 of a locomotive side rod lubricating device. The inner face of the body portion 5 is milled or grooved to form converging grease passages or ducts 21 which intersect at an opening 22 formed in the block 8 and which opening, in turn, communicates with the discharge opening 19 so that as the gears rotate the grease will be forced under pressure through the passages 21 and opening 22 into the fitting 20 and thence to the parts on the locomotive side rod to be lubricated. A by-pass 23 is preferably formed in the inner wall of the body portion 5 at the rear of the intermeshing driving gears 11, the purpose of which is to direct any grease that may adhere to the driving gears 11 back into the converging passages 21 and thence out through the discharge opening into the lubricating fitting and thereby prevent choking or clogging of said driving gears.

It will thus be seen that, when the motor 17 is connected with the shaft extension 16, motion will be transmitted to the driving gears 11 and thence to the main gears 10, the direction of rotation of said gears being indicated by arrows in Figure 4 of the drawings. As the gears rotate, the stick of grease will be fed downwardly between the gears 10 and as the teeth of the driving gears 11 mesh with the teeth of the main gears the grease will be forced under pressure into the converging passages 21 and thence through the opening 22 into the fitting 20 leading to the part or parts of the side rods of the locomotive to be lubricated. Should any surplus grease adhere to the driving gears 11, said grease will be forced into the by-pass 23 and as the driving gears rotate said surplus grease will be carried upwardly by the driving gears into the adjacent passages 21 and thence outwardly through the opening 22 into the lubricating fitting 20, thereby preventing choking or clogging of the driving gears and consequent interference with the proper function of the grease gun.

The device is light in weight and can be readily carried under the arm of a workman when lubricating side rods or other moving parts of a locomotive.

It will, of course, be understood that the devices may be made in different sizes and shapes and constructed of any suitable material without departing from the spirit of the invention.

Having thus described the invention, what is claimed as new is:

1. A device of the class described comprising a casing, coacting non-meshing main gears mounted for rotation in the casing, driving gears meshing with the main gears, a source of grease supply communicating with the main gears, there being intersecting converging passages formed in the casing at said main gears, and a by-pass disposed between the driving gears for conducting surplus grease into said converging passages.

2. A device of the class described comprising a casing having a discharge opening in one wall thereof, coacting non-meshing main gears mounted for rotation in the casing, driving gears meshing with the main gears, means communicating with the interior of the casing at the main gears for supplying grease to said main gears, there being converging passages formed in the casing at said main gears and intersecting at said discharge opening, and a by-pass disposed between the driving gears for conducting excess grease therein to the discharge opening.

3. A device of the class described comprising a casing having relatively large and small compartments formed therein and having one wall thereof provided with a discharge opening, coacting non-meshing main gears mounted for rotation in the large compartments, driving gears mounted for rotation in the small compartments and intermeshing with the main gears, a source of grease supply communicating with the main gears, bearings for said main and driving gears, a cover plate detachably secured to the casing and provided with caps receiving the journals of the gears, there being inclined grease passages formed in the casing and intersecting at the discharge opening, and a by-pass formed in the casing between the driving gears for conducting excess grease to said discharge opening.

4. A device of the class described comprising a casing having a discharge opening, coacting non-meshing main gears mounted for rotation in the casing, driving gears meshing with the main gears, a source of grease supply communicating with the interior of the casing at said main gears, a rigid block disposed within the casing between the main gears and driving gears and having its walls conforming to the shape of the adjacent gears, there being converging grease passages extending through said rigid block and intersecting at the discharge opening, and a by-pass formed in the casing between the driving gears for conducting excess grease through the converging passage gears to the discharge opening.

5. A device of the class described comprising a casing formed of detachably united sections provided with integral hollow caps, one of said sections being provided with a discharge opening, coacting main gears mounted for rotation within the casing, driving gears meshing with the main gears, shafts extending through said gears and having their ends journaled in the caps, a rigid block secured to one of said casing sections and provided with a flat face bearing against the other casing section, and a source of grease supply communicating with the interior of the casing at the main gears, one of the casing sections being provided with converging grease passages extending through the rigid block and intersecting at the discharge opening.

RALPH C. TROYER.